(12) United States Patent
Basche et al.

(10) Patent No.: US 7,877,810 B2
(45) Date of Patent: Jan. 25, 2011

(54) SYSTEM, METHOD AND CLIENT USER INTERFACE FOR A COPY PROTECTION SERVICE

(75) Inventors: Todd Basche, Los Altos, CA (US); Usha Srinivasan, Santa Clara, CA (US); James Patterson, San Francisco, CA (US); Mitesh Pancholy, San Francisco, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1279 days.

(21) Appl. No.: 11/067,859

(22) Filed: Feb. 28, 2005

(65) Prior Publication Data

US 2005/0198535 A1 Sep. 8, 2005

Related U.S. Application Data

(60) Provisional application No. 60/549,223, filed on Mar. 2, 2004.

(51) Int. Cl.
*G06F 7/06* (2006.01)
*G06F 17/30* (2006.01)
*H04N 7/16* (2006.01)

(52) U.S. Cl. ............................. 726/26; 726/4; 713/155; 713/193

(58) Field of Classification Search .................. 713/201, 713/200, 155, 193; 705/37, 26; 709/228, 709/225; 726/4
See application file for complete search history.

(56) References Cited

U.S. PATENT DOCUMENTS

| | | |
|---|---|---|
| 4,790,017 A | 12/1988 | Hinton |
| 5,437,050 A | 7/1995 | Lamb et al. |
| 5,708,759 A | 1/1998 | Kemeny |
| 5,848,396 A | 12/1998 | Gerace |
| 5,914,714 A * | 6/1999 | Brown .................. 715/866 |
| 5,918,223 A | 6/1999 | Blum et al. |
| 5,925,843 A | 7/1999 | Miller et al. |
| 5,956,671 A | 9/1999 | Ittycheriah et al. |
| 5,978,791 A | 11/1999 | Farber et al. |
| 6,188,010 B1 | 2/2001 | Iwamura |
| 6,415,280 B1 | 7/2002 | Farber et al. |
| 6,502,125 B1 | 12/2002 | Kenner et al. |

(Continued)

FOREIGN PATENT DOCUMENTS

FR 2 816 417 A1 5/2005

(Continued)

OTHER PUBLICATIONS

V Vishnumurthy; A Secure Economic Framework for Peer-to-Peer Resource Sharing; Year:2003; p. 1-6.*

(Continued)

*Primary Examiner*—Kambiz Zand
*Assistant Examiner*—William S Powers
(74) *Attorney, Agent, or Firm*—Victor H. Okumoto (57) ABSTRACT

A system, method and client user interface for a copy protection service employs software agents masquerading as nodes in decentralized networks for monitoring and interdicting file sharing activities of protected files in the networks. A control center communicates with the software agents and subscriber client computers through user interfaces, so as to provide monitoring information to users of the client computers and control the monitoring and interdiction of protected files according to instructions received from the client computers. A one-click method for requesting protection of a file, providing the terms of such protection, and updating billing information for the user is implemented through the user interface to simplify user interaction with the copy protection service.

61 Claims, 9 Drawing Sheets

U.S. PATENT DOCUMENTS

| | | | |
|---|---|---|---|
| 6,553,403 B1 | 4/2003 | Jarriel et al. | |
| 6,625,643 B1 | 9/2003 | Colby et al. | |
| 6,665,726 B1 | 12/2003 | Leighton et al. | |
| 6,678,680 B1 | 1/2004 | Woo | |
| 6,708,212 B2 | 3/2004 | Porras et al. | |
| 6,732,180 B1* | 5/2004 | Hale et al. | 709/229 |
| 6,799,221 B1 | 9/2004 | Kenner et al. | |
| 6,826,546 B1* | 11/2004 | Shuster | 705/52 |
| 6,892,227 B1 | 5/2005 | Elwell et al. | |
| 6,947,386 B2 | 9/2005 | Temudo de Castro et al. | |
| 6,981,180 B1 | 12/2005 | Bailey et al. | |
| 7,020,701 B1 | 3/2006 | Gelvin et al. | |
| 7,100,199 B2* | 8/2006 | Ginter et al. | 726/4 |
| 7,111,061 B2 | 9/2006 | Leighton et al. | |
| 7,120,800 B2* | 10/2006 | Ginter et al. | 713/193 |
| 7,136,922 B2 | 11/2006 | Sundaram et al. | |
| 7,143,170 B2 | 11/2006 | Swildens et al. | |
| 7,155,723 B2 | 12/2006 | Swildens et al. | |
| 7,185,052 B2 | 2/2007 | Day | |
| 7,194,522 B1 | 3/2007 | Swildens et al. | |
| 7,203,753 B2* | 4/2007 | Yeager et al. | 709/225 |
| 7,313,619 B2* | 12/2007 | Torrant et al. | 709/225 |
| 7,356,487 B2* | 4/2008 | Kitze | 705/26 |
| 7,363,278 B2* | 4/2008 | Schmelzer et al. | 705/67 |
| 7,376,749 B2 | 5/2008 | Loach et al. | |
| 7,409,644 B2* | 8/2008 | Moore et al. | 715/774 |
| 7,490,149 B2 | 2/2009 | Omote et al. | |
| 2001/0037314 A1 | 11/2001 | Ishikawa | |
| 2002/0065880 A1 | 5/2002 | Hasegawa et al. | |
| 2002/0082999 A1 | 6/2002 | Lee et al. | |
| 2002/0083060 A1 | 6/2002 | Wang et al. | |
| 2002/0087885 A1* | 7/2002 | Peled et al. | 713/201 |
| 2002/0099955 A1 | 7/2002 | Peled et al. | |
| 2002/0120859 A1* | 8/2002 | Lipkin et al. | 713/200 |
| 2002/0141387 A1 | 10/2002 | Orshan | |
| 2002/0143894 A1 | 10/2002 | Takayama | |
| 2002/0152173 A1 | 10/2002 | Rudd | |
| 2002/0152261 A1 | 10/2002 | Arkin et al. | |
| 2002/0152262 A1* | 10/2002 | Arkin et al. | 709/202 |
| 2002/0174216 A1 | 11/2002 | Shorey et al. | |
| 2002/0194108 A1* | 12/2002 | Kitze | 705/37 |
| 2003/0023421 A1 | 1/2003 | Finn et al. | |
| 2003/0028889 A1 | 2/2003 | McCoskey et al. | |
| 2003/0056118 A1 | 3/2003 | Troyansky et al. | |
| 2003/0061287 A1 | 3/2003 | Yu et al. | |
| 2003/0061490 A1* | 3/2003 | Abajian | 713/176 |
| 2003/0070070 A1 | 4/2003 | Yeager et al. | |
| 2003/0093794 A1 | 5/2003 | Thomas et al. | |
| 2003/0095660 A1 | 5/2003 | Lee et al. | |
| 2003/0097299 A1 | 5/2003 | O'Kane et al. | |
| 2003/0130953 A1 | 7/2003 | Narasimhan et al. | |
| 2003/0135548 A1 | 7/2003 | Bushkin | |
| 2003/0195852 A1 | 10/2003 | Campbell et al. | |
| 2003/0233541 A1* | 12/2003 | Fowler et al. | 713/155 |
| 2003/0236787 A1 | 12/2003 | Burges | |
| 2004/0010417 A1 | 1/2004 | Peled | |
| 2004/0030691 A1 | 2/2004 | Woo | |
| 2004/0030743 A1 | 2/2004 | Hugly et al. | |
| 2004/0031038 A1 | 2/2004 | Hugly et al. | |
| 2004/0034798 A1 | 2/2004 | Yamada et al. | |
| 2004/0093354 A1 | 5/2004 | Xu et al. | |
| 2004/0103280 A1* | 5/2004 | Balfanz et al. | 713/169 |
| 2004/0107215 A1 | 6/2004 | Moore et al. | |
| 2004/0111604 A1 | 6/2004 | Fournier | |
| 2004/0139329 A1* | 7/2004 | Abdallah et al. | 713/182 |
| 2004/0158546 A1 | 8/2004 | Sobel et al. | |
| 2004/0181688 A1* | 9/2004 | Wittkotter | 713/201 |
| 2005/0075119 A1 | 4/2005 | Sheha et al. | |
| 2005/0089014 A1 | 4/2005 | Levin et al. | |
| 2005/0091167 A1 | 4/2005 | Moore et al. | |
| 2005/0105476 A1 | 5/2005 | Gotesdyner et al. | |
| 2005/0108378 A1 | 5/2005 | Patterson et al. | |
| 2005/0114709 A1 | 5/2005 | Moore | |
| 2005/0147044 A1 | 7/2005 | Teodosiu et al. | |
| 2005/0154681 A1 | 7/2005 | Schmelzer | |
| 2005/0198317 A1* | 9/2005 | Byers | 709/228 |
| 2005/0203851 A1 | 9/2005 | King et al. | |
| 2005/0216433 A1 | 9/2005 | Bland et al. | |
| 2005/0265367 A1 | 12/2005 | Teodosiu et al. | |
| 2005/0267945 A1 | 12/2005 | Cohen et al. | |
| 2006/0015936 A1 | 1/2006 | Illowsky et al. | |
| 2006/0149806 A1 | 7/2006 | Scott et al. | |
| 2007/0074019 A1 | 3/2007 | Seidel | |
| 2007/0143405 A1 | 6/2007 | Bland et al. | |

FOREIGN PATENT DOCUMENTS

| | | |
|---|---|---|
| WO | WO 01/11496 A2 | 2/2001 |
| WO | WO 01/50354 A1 | 7/2001 |
| WO | WO 01/77775 | 10/2001 |
| WO | WO 02/075595 | 9/2002 |
| WO | WO 02/077847 | 10/2002 |
| WO | WO 02/082271 | 10/2002 |
| WO | WO 2005/006157 A1 | 1/2005 |
| WO | WO 2005/043359 A1 | 5/2005 |
| WO | WO 2005/043819 A2 | 5/2005 |
| WO | WO 2005/046174 A1 | 5/2005 |
| WO | WO 2005/109179 A2 | 11/2005 |
| WO | WO 2006/041742 A2 | 4/2006 |
| WO | WO 2006/086158 A2 | 8/2006 |

OTHER PUBLICATIONS

Cuenca-Acuna et al., Autonomous Replication for High Availability in Unstructured P2P Systems, Technical Report, Dept. of Computer Science, Rutgers University, Apr. 2003, pp. 1-21.*

Yatin Chawathe et al., "Making Gnuttella-Like P2P Systems Scalable", SIGCOMM '03, 'Online!, Aug. 25, 2003, XP002315870, Karlsruhe, Germany, Retrieved for the Internet: URL: http//delivery.acm.org/, Retrieved on Jan. 31, 2005, Section 1: Introduction.

PCT Search Report for PCT/US2004/029869 dated Feb. 22, 2005.

Cuenca-Acuna, F M, et al., Autonomous Replication for High Availability in Unstructured P2P Systems, Reliable Distributed Systems, 2003. Proceedings. 22nd International Symposium on Oct. 6-8, 2003, Piscataway, NJ, USA, IEEE, Oct. 6, 2003, pp. 99-108.

Dias, D M., et al., A Scalable and Highly Available Web Server, Feb. 25, 1996, Digest of Papers of Compcon (Computer Society Conference) 1996 Technologies for the Information Superhighway. Santa Clara, Feb. 25-28, 1996, Digest of Papers of the Computer Society Computer Conference Compcon, Los Alamitos, IEEE Comp. Soc. Press, 8 pages.

Lee, C Y, Application of a cross decomposition algorithm to a location and allocation problem in distributed systems, Computer Communications, Elsevier Science Publishers BV, Amsterdam, NL, vol. 18, No. 5, May 1995, pp. 367-377.

Lichtman, D, Jacobson, D., Anonymity a Double-Edged Sword for Pirates Online, The Chicago Tribune, Apr. 13, 2000, 2 pages.

Neild, L L, et al., Investigating Peer-to-peer Systems for Resource Sharing within a Small Group of Nodes, Information Technology : Coding and Computing, 2004. Proceedings. ITCC 2004. International Conference on Las Vegas, NV, USA, Apr. 5-7, 2004, Piscataway, NJ, USA, IEEE, vol. 2, Apr. 5, 2004, pp. 400-404.

Oliveira, L B E, et al., Evaluation of Ad-Hoc Routing Protocols under a Peer-to-Peer Application, Mar. 16, 2003, Wireless Communications and Networking, 2003. WCNC 2003. 2003 IEEE Mar. 16-20, 2003, Piscataway, NJ, USA, IEEE, pp. 1143-1148.

Ozmutlu S, et al., A day in the life of Web searching : an exploratory study, Information Processing & Management Elsevier, Barking, GB, vol. 40, No. 2, Mar. 2004, pp. 319-345.

Pastor, L, et al., An Efficiency and Scalability Model for Heterogeneous Clusters, 42nd Annual Symposium on Foundations of Computer Science. (FOCS 2001). Las Vegas, Oct. 14-17, 2001. Annual Symposium on Foundations of Computer Science, Los Alamitos, CA: IEEE Comp. Soc, US, Oct. 8, 2001, pp. 427-434.

Schroeder, T, et al., Scalable Web Server Clustering Technologies, IEEE Network, IEEE Inc. New York, US, vol. 14, No. 3, May 2000, pp. 38-45.

PCT Search Report for PCT/GB 02/01347 mailed Aug. 21, 2002, 2 pages.

PCT Search Report for PCT/US2004/029798 mailed Dec. 21, 2004, 2 pages.

PCT Search Report for PCT/US2004/029685 mailed Apr. 27, 2005, 3 pages.

PCT Search Report for PCT/US05/15643 mailed Jan. 13, 2006, 1 page.

International Search Report for International application No. PCT/US05/06279 mailed Apr. 22, 2008, 1 page.

Ito, Mabo Robert, et al., Zero-Crossing Measurements for Analysis and Recognition of Speech Sounds, IEEE Transactions on Audio and Electroacoustics, vol. AU-19, No. 3, Sep. 1971, pp. 235-242.

Patent Abstracts of Japan, Publication No. 2000-322080, Mitsubishi Electric Corp, published : Nov. 24, 2000, 1 pg.

Dijker, Barb, Re : [SAGE] IP Assignment Map ???, Aug. 20, 2001, http://www.sage.org/lists/sage-members-archive/2001/msg01063.html, pp. 1-2.

Hubbard, K., et al., RFC 2050, Obsoletes : 1466 : Internet Registry IP Allocation Guidelines, Nov. 1996, http://www.ietf.org/rfc/rfc2050.txt?number=2050, pp. 1-13.

Kedem, Benjamin., Spectral Analysis and Discrimination by Zero-Crossings, Proceedings of the IEEE, IEEE, New York, NY, U.S.A., vol. 74, No. 11, Nov. 1, 1986, pp. 1477-1493.

Ooghe, Sven, et al., Impact of the Evolution of the Metropolitan Network on the DSL Access Architecture, IEEE Communications Magazine, Feb. 2003, pp. 140-145.

Parlante, Nick, IP Routing, Handout # 5, Spring, 2001-2002, Stanford, pp. 1-6.

Passarge, Elke, Layer 4 switching : The magic combination, Network World, Feb. 15, 1999, http://www.networkworld.com/newsletters/lans/0215lan1.html, pp. 1-3.

Rybczynski, Tony, Nortel : Layer 4 switching is an illusion, Network World, Feb. 8, 1999, http://www.networkworld.com/forum/0208layer4no.html, pp. 1-3.

Saunders, John, Real-Time Discrimination of Broadcast Speech/Music, IEEE International Conference on Acoustics, Speech, and Signal Processing—Proceedings, (ICASSP), Atlanta, May 7-10, 1996 ; [IEEE International Conference on Acoustics, Speech, and Signal Processing—Proceedings. (ICASSP)], New York, NY, U.S.A., vol. 2, May 7, 1996, pp. 993-996.

Smith, Gavin, et al., Quick Audio Retrieval Using Active Search, Proc. Of 1998 IEEE ICASSP, May 12, 1998, vol. 6, pp. 3777-3780.

Socolofsky, T., et al., Request for Comments : 1180, A TCP/IP Tutorial, Jan. 1991, http://tools.ietf.org/html/rfc1180, pp. 1-28.

VPN—Virtual private Networking, an overview, Jan. 24, 2002, http://web.archive.org/web/20020124162522/http://homenethelp.com/vpn/, pp. 1-2.

Supplementary European Search Report for Application No. EP 05 72 3934 completed on Nov. 8, 2010, 1 page.

* cited by examiner

SYSTEM, METHOD AND CLIENT USER INTERFACE FOR A COPY PROTECTION SERVICE

CROSS REFERENCE TO RELATED APPLICATIONS

This application claims priority to U.S. provisional application Ser. No. 60/549,223 filed Mar. 2, 2004, which is incorporated herein by reference.

FIELD OF THE INVENTION

The present invention generally relates to the interdiction of unauthorized copying in decentralized networks and in particular, to a system, method and client user interface for a copy protection service.

BACKGROUND OF THE INVENTION

Unauthorized copying in decentralized networks using peer-to-peer (P2P) file sharing has become a major concern to owners of copyrighted material. Unlike a centralized network, decentralization makes it commercially impractical to pursue all copyright violators in court. This is because decentralization requires filing lawsuits against virtually millions of client computer operators instead of only one party operating a central computer.

Accordingly, copyright owners seek other methods for protecting their copyrighted material, such as blocking, diverting or otherwise impairing the unauthorized distribution of their copyrighted works on a publicly accessible decentralized or P2P file trading network. In order to preserve the legitimate expectations and rights of users of such a network, however, it is desirable that copyright owners do not alter, delete, or otherwise impair the integrity of any computer file or data lawfully residing on the computer of a file trader.

U.S. Pat. No. 6,732,180 describes one method of interdicting unauthorized copying in a decentralized network using decoy files. In the method described, the network is scanned for media to be protected. When such media is found, decoy files are distributed through controlled nodes in the network so as to reduce the likelihood of a successful download. The number of controlled nodes in this case is determined so as to satisfy a specified effective decoy ratio related to the number of nodes offering decoy versions of the media and the total number of nodes offering real versions of the media.

The cost and advanced technology to implement and maintain such a system to interdict unauthorized copying of protected files (i.e., files individually containing content that is to be protected against unauthorized copying) may be prohibitive, however, for many content owners (e.g., the copyright owners of such content). To satisfy the needs of these and other owners of the content of files, a copy protection services industry has developed in recent years. Interfaces to and information provided by such service companies, however, are generally crude and/or difficult to customize to the individual needs and/or preferences of content owners. This is especially apparent where a content owner may desire to define different levels of protection among its owned content, in order to balance the cost of protection against any financial benefit of such protection.

OBJECTS AND SUMMARY OF THE INVENTION

Accordingly, it is an object of one or more aspects of the present invention to provide a system, method and client user interface for a copy protection service that provides user selectable monitoring information formats for protected files.

Another object is to provide such a system, method and client user interface that provides an alert mechanism for automatically informing a user when a protected file has reached a user specified threshold level in a decentralized network.

Another object is to provide such a system, method and client user interface that provides user selectable interdiction levels for protected files in a decentralized network.

Still another object is to provide such a system, method and client user interface that is easy for a user to interface with for specifying such monitoring and interdiction requirements and levels.

Yet another object is to provide such a system, method and client user interface that automatically adjusts billing information for a user as the user modifies interdiction levels for protected files.

These and additional objects are accomplished by the various aspects of the present invention, wherein briefly stated, one aspect is a system for providing a copy protection service, comprising: a plurality of software agents masquerading as nodes in a decentralized network for monitoring and interdicting file sharing activities of a protected file; and a control center configured to communicate with the plurality of software agents and a client computer, so as to provide information of such monitoring to the client computer and control such monitoring and interdicting according to instructions received from the client computer.

Another aspect is a method for providing a copy protection service, comprising: receiving file information for one or more protected files in one or more decentralized networks from a plurality of software agents masquerading as nodes in the one or more decentralized networks; providing the file information to one or more client computers respectively associated with individual of the one or more protected files; receiving interdiction instructions from the one or more client computers; and commanding the plurality of software agents to interdict file sharing activities in the one or more decentralized networks for the one or more protected files according to the interdiction instructions.

Another aspect is a one-click method for providing a copy protection service, comprising: receiving a protection command associated with a protected file from a client computer; updating billing information associated with the client computer to reflect the protection command; and interdicting file sharing activities for the protected file in a decentralized network according to the protection command.

Still another aspect is a user interface method associated with a copy protection service, comprising: displaying information of a protected file in a decentralized network on a display screen of a client computer; and displaying a user selectable protection option on the display screen so that upon selection of the user selectable protection option and specification of interdiction terms by a user of the client computer, a protection request to interdict file sharing activity of the protected file in the decentralized network is transmitted to a control center providing a copy protection service.

Additional objects, features and advantages of the various aspects of the present ion will become apparent from the following description of its preferred embodiment, description should be taken in conjunction with the accompanying drawings.

DETAILED DESCRIPTION OF THE PREFERRED EMBODIMENT

Figure 1:
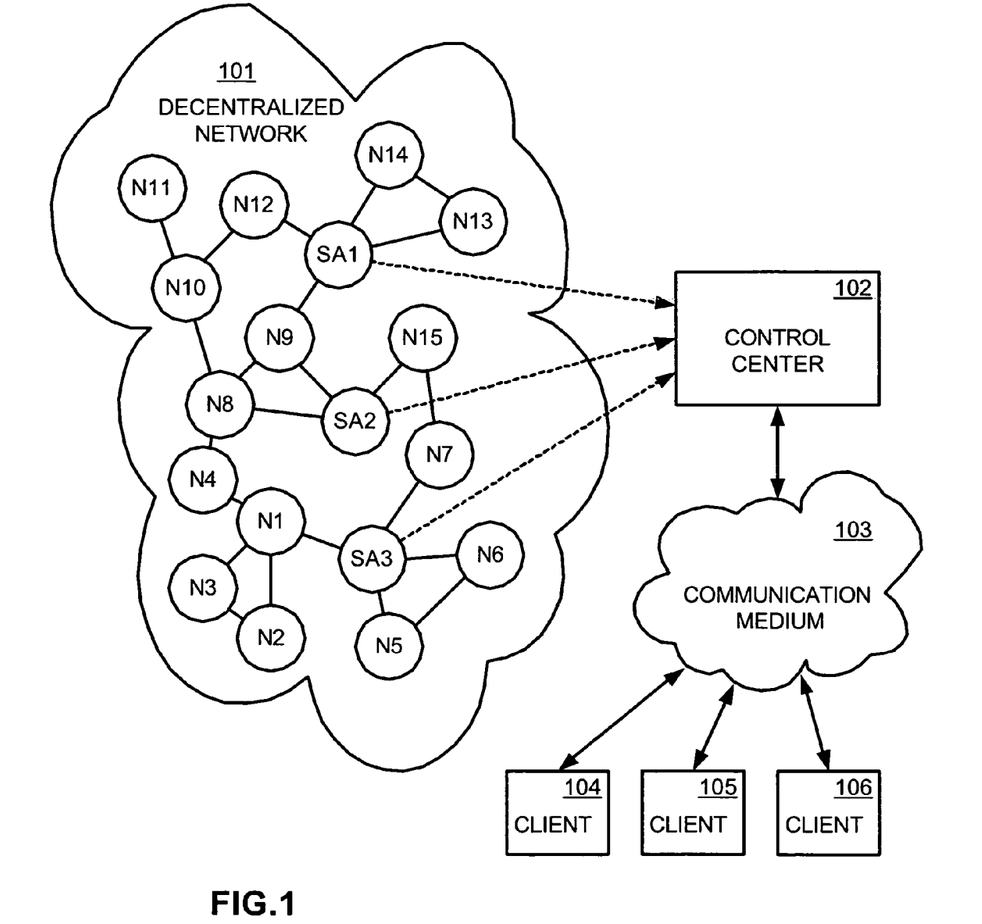
FIG. 1 illustrates a block diagram of a system for providing copy protection services, utilizing aspects of the present invention.

FIG. 1 illustrates, as an example, a block diagram of a System providing a copy protection service for interdiction of unauthorized copying of files residing on Nodes (such as nodes N1~N15) of a Decentralized Network 101. The Decentralized Network 101 is a peer-to-peer file sharing network configured such as any of those being used to share files of copyrighted material through free downloading of copies without paying appropriate compensation to their respective copyright owners.

In addition to copy protection, the System also provides a web-based reporting and analysis application that gathers and synthesizes large amounts of piracy-related data for catalog titles on various filing sharing networks (such as the Decentralized Network 101 as well as others). Subscribers can thus monitor file-sharing activity related to specific titles in their catalog, generate reports on metrics such as supply, demand and availability for a title on any network and further refine charts displayed to the User by geography (e.g., DMA, country, etc.) and/or domain.

Although in the following description, the files to be protected are assumed to be music files, the copy protection service can be used to protect any type of file or object as those terms are conventionally understood, such as or as well as, a document, message, computer program, data, all forms of media (such as audio, video, animation, and images), and any other content or information protected under copyright or any other intellectual property law that is capable of being communicated between two nodes of a network.

In a decentralized network, there is no central authority or managing entity. Each node of the decentralized network makes decisions autonomously to connect, disconnect, and share information with other nodes in the decentralized network according to a predetermined protocol established by the creators of the decentralized network. Files are stored in the nodes of the decentralized network and propagated throughout the decentralized network via inter-nodal exchange. Users of the nodes search the decentralized network using search queries at their respective nodes for specific files and then select a host node from the search results to download or stream the content from.

Components of the System include a Control Center 102, a plurality of Software Agents (such as agents SA1~SA3) masquerading as nodes of the Decentralized Network 101 by following all the traditions and policies of the Decentralized Network 101 so that the Software Agents are virtually indistinguishable as infiltrators, and Client Application Software residing on Client Computers (such as clients 104~106) operated by Users authorized to access the System as or by Subscribers of the copy protection service.

The Software Agents are uniformly distributed throughout the Decentralized Network 101 to perform instrumentation and/or interdiction functions. The Software Agents are implemented as software or agents residing on one or more computers that communicate with Nodes in the Decentralized Network 101 through individually assigned ports of the computers on which they reside. IP addresses for the ports may vary with time or in some other manner so that detection of the Software Agents as unauthorized masqueraders of nodes in the Decentralized Network 101 is made difficult.

Similar software agents are placed in other decentralized networks for instrumentation and interdiction purposes. Like the Software Agents in the Decentralized Network 101, these other software agents are also controlled by and communicate with the Control Center 102.

Figure 2:
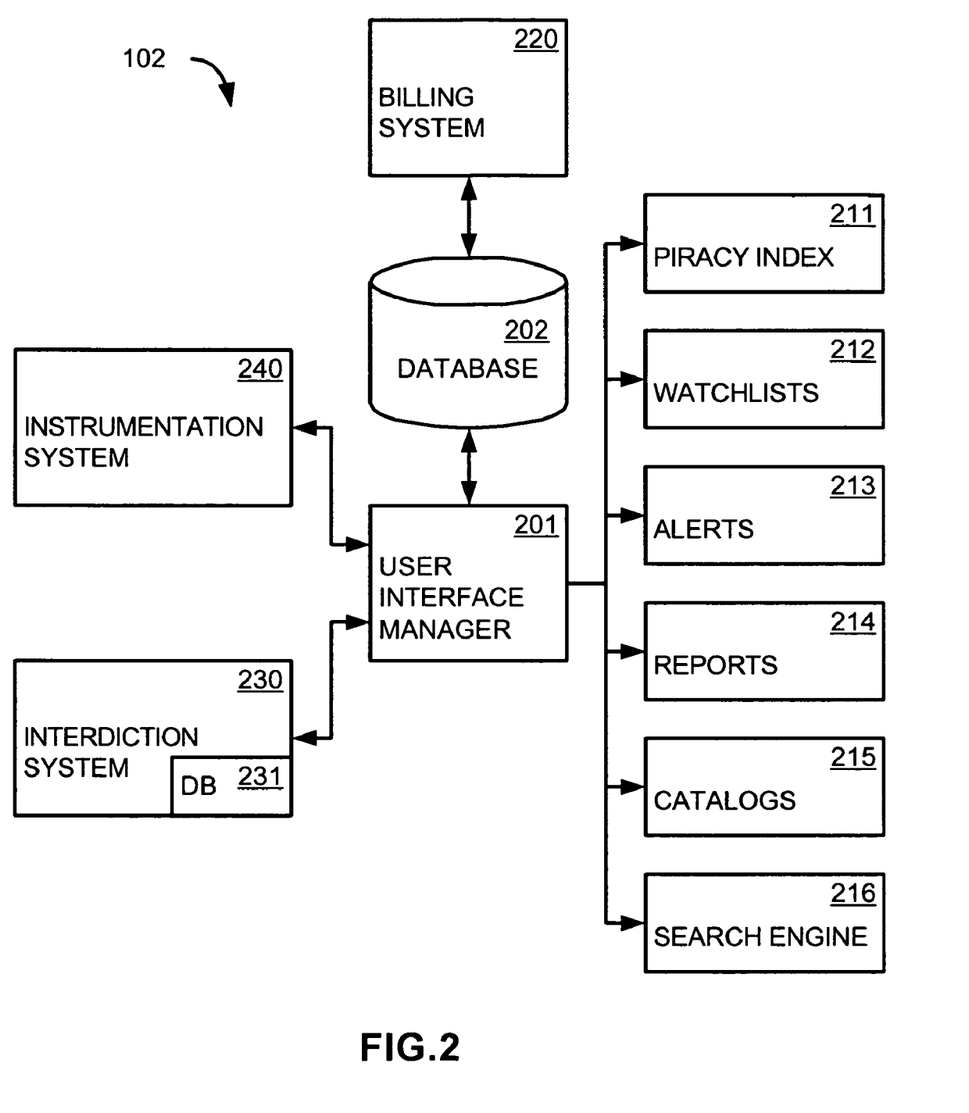
FIG. 2 illustrates a block diagram of a control center in a system for providing copy protection services, utilizing aspects of the present invention.

FIG. 2 illustrates, as an example, a block diagram of the Control Center 102 which is preferably implemented by various software modules running on one or more computers. A User Interface Manager 201 controls access to the copy protection service by Users of Client Computers (such as 104~106) through a conventional log-on procedure on a Website hosted by the Control Center 102, and manages the flow of information from and to the Client Computers in cooperation with client application software residing on the Client Computers. The client application software manages the display of information through a Client User Interface running as an application launched in Web Browsers on the Client Computers.

A number of software modules support the User Interface Manager 201 in its information exchanges with the client application software, and their display through the Client User Interface. Among these supporting software modules are a Piracy Index module 211, a WatchLists module 212, an Alerts module 213, a Reports module 214, a Catalogs module 215, and a Search Engine module 216, whose use and operations will be explained below.

Database 202 stores Subscriber information including content owned and content paid to be copy protected by the Subscriber, and the level (i.e., Platinum, Gold or Silver) and duration of any such copy protection. Catalog data comprising for each music file, the artist, the album and the corresponding track title is included in such Subscriber information. For accurate identification of copies of the music files on decentralized networks being monitored by the System, metadata and audio content for each such title are also included.

A Billing System 230 keeps track of charges and invoices the Subscribers according to information stored in the Database 202.

An Interdiction System 230 performs copy protection activities by sending instructions to the Software Agents (such as agents SA1~SA3) through a private network specifying actions to be taken when the Software Agents receive search results or search strings identifying files that are to be protected by the copy protection service according to information stored in a database ("DB") 231 in the Interdiction System 230. Additional details of such an interdiction system are provided, for example, in commonly-owned U.S. application Ser. No. 10/803,784 filed Mar. 18, 2004, which is incorporated herein in its entirety by this reference.

An Instrumentation System 240 estimates various characteristics of the Decentralized Network 101, such as: the size, growth rate, and growth acceleration of the Decentralized Network 101; the number of instances, the rate of propagation, and the acceleration of propagation of a file in the Decentralized Network 101; and the search and download activities, in the aggregate and for particular files, in the Decentralized Network 101. Additional details of such an instrumentation system are provided, for example, in commonly-owned U.S. application Ser. No. 10/818,674 filed Apr. 6, 2004, which is incorporated herein in its entirety by this reference.

Figure 3:
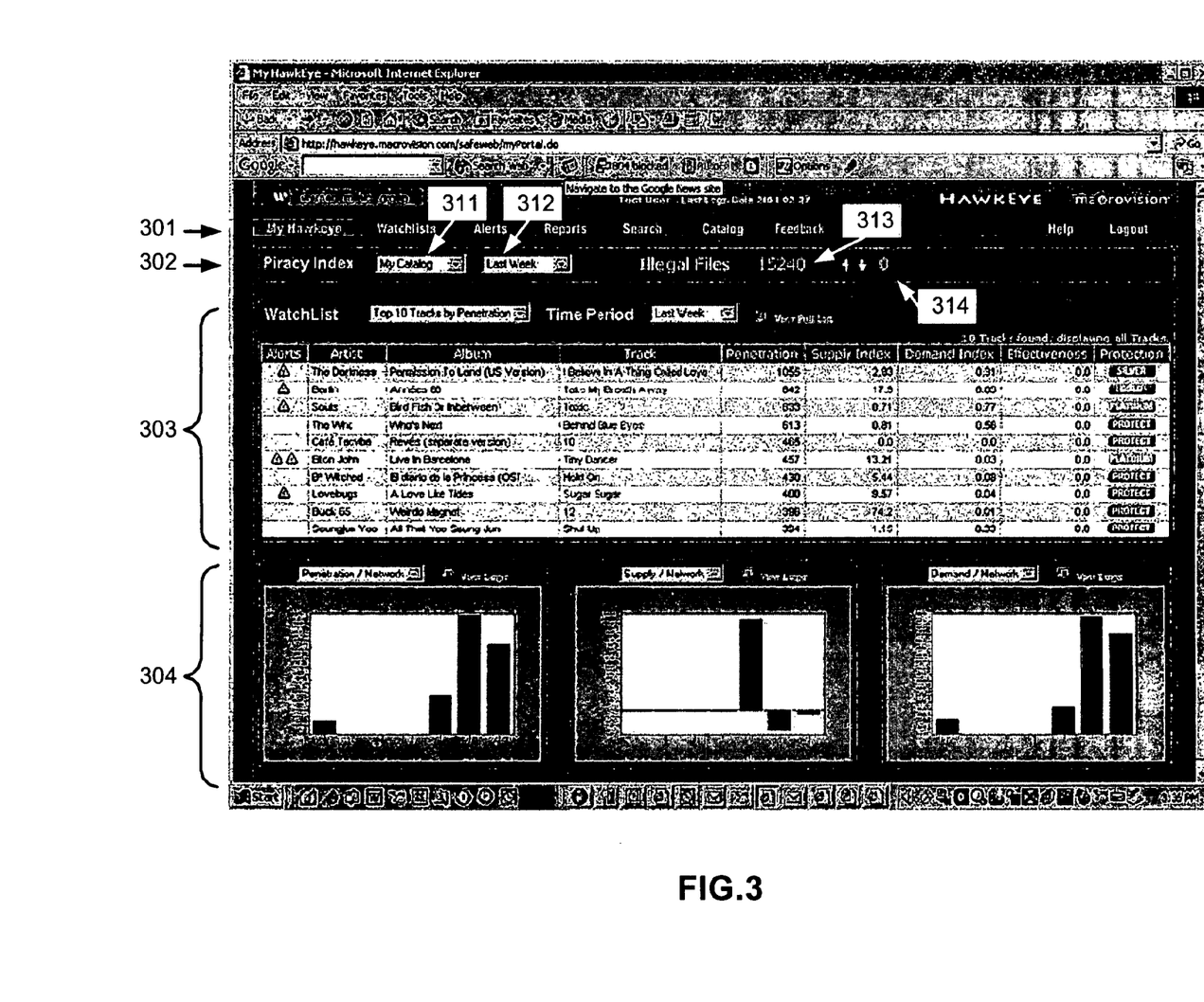
FIG. 3 illustrates a Home-page screen-shot generated through a user interface, utilizing aspects of the present invention.

FIG. 3 illustrates, as an example, a home-page (My Hawkeye) screen-shot generated through the Client User Interface. The lay-out of the dashboard or home-page is customizable by the Subscriber's authorized User running the application, and provides a portal view to display a combination of supported components. It allows the User easy access to features of interest on one page, and reduces the need to navigate multiple screens of the Console. All components of this view are a replication of functionalities fully implemented in other areas of the Console.

A Tab Line (or Navigation Menu) 301 facilitates User selection of predefined pages to be displayed such as a WatchLists-page through a WatchLists-tab, an Alerts-page through an Alerts-tab, a Reports-page through a Reports-tab, a Search-page through a Search-tab, a Catalog-page through a Catalog-tab, and a Feedback-page through a Feedback-tab. Also provided on the Tab Line 301 are tabs for conventional Help and Logout functions.

A Piracy Index line 302 indicates the number of illegal files found in the Decentralized Network 101 for a catalog of music files that is selected using a drop-down box or pull-down menu 311. The catalog in this case may be the Subscriber's catalog of music files (My Catalog) or a catalog of music files for the entire music industry (Industry).

In addition to the total number of illegal files indicated in area 313, the change in the number of illegal files found over a specified period of time is indicated in area 314 with increase or decrease respectively indicated by lighting either an up or down arrow preceding the area 314. The period of time is specified in this case using drop-down box 312, providing a choice of time periods such as over the last hour, the last day, the last week, the last month, etc.

Determination of the number of illegal files in the Decentralized Network 101 and the change in such illegal files is performed by the Instrumentation System 240. The Piracy Index module 211 communicates the information provided in drop-down boxes 311 and 312 to the Instrumentation System 240, and communicates the results generated by the Instrumentation System 240 to the User Interface Manager 201 for display in areas 313 and 314.

A WatchList area 303 includes information for a selected WatchList of music files. This area provides a quick view of the extent of illegal file activity for the music files in the WatchList, and the effectiveness of any copy protection activities. Additional details on this area are described in reference to FIG. 4.

An area 304 displays graphs according to attributes designated in corresponding drop-down boxes. This area provides a quick visual view of the designated attributes using information provided by the Instrumentation System 240. In particular, attributes such as supply, demand, availability, effectiveness indices, and various growth and acceleration rates can be viewed over a combination of two independent variables such as: type of file sharing network, geography (DMA, country, etc.), organization (or domain), and time. As an example, the User can specify a chart or graph on the penetration of the "Ray of Light" track by Madonna by network in the Los Angeles area (DMA) or view the rate of change of demand for Sheryl Crow's "Leaving Las Vegas" by network over time.

For every chart (or graph) the User has the option to save the chart graphics onto his or her desktop in a format (e.g., SVG, EPS) that permits lossless scaling and object decomposition in the destination environment. This allows the User to use the chart in reports and presentations.

Additionally, the User can also export the data associated with the chart to his or her desktop in a format (e.g., CSV) that permits pasting into Microsoft Excel.

Figure 4:
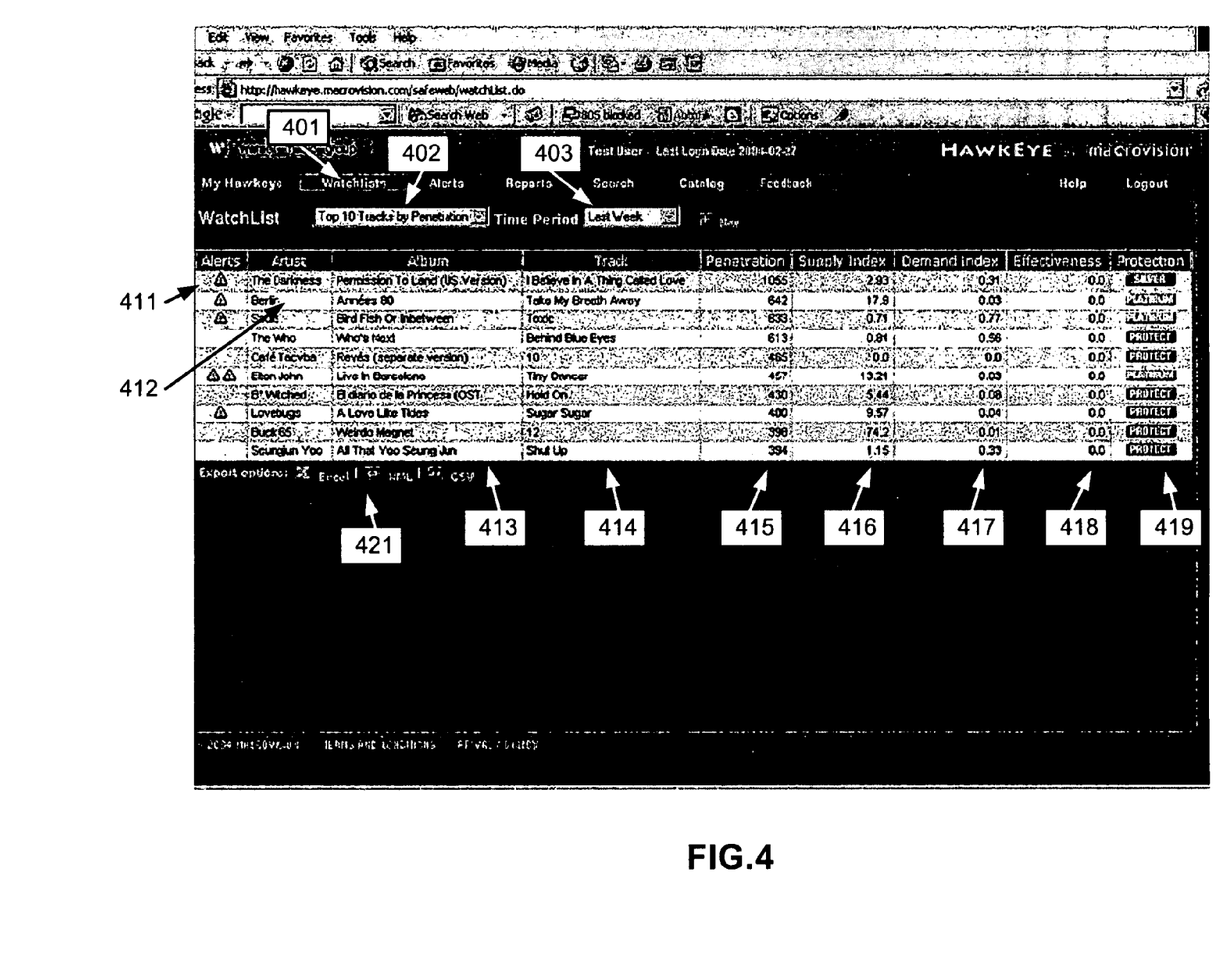
FIG. 4 illustrates a "WatchLists" sub-page screen-shot generated through a user interface, utilizing aspects of the present invention.

FIG. 4 illustrates, as an example, a WatchLists-page screen-shot generated by the Client User Interface upon User selection of the WatchLists tab 401.

There are two basic types of WatchLists. The first type is System-Defined WatchLists. These lists are "prefabricated" and the User has no choice in what works are included in the list, or what metrics are monitored and presented for display. In general, the System-Defined WatchLists provide a useful snapshot of industry-wide data and trends in supply and demand for protected works on the monitored file-sharing networks. These lists are automatically generated by the System based on statistical analysis of data gathered for the entire catalog. Examples of System-Defined WatchLists are: Top 10 Artists by Demand, and Top 10 Albums by Supply.

The second type of WatchLists is User-Defined WatchLists. These lists are created by the User. This type of WatchLists is provided as a convenience to the User so that the User can keep track of a subset of works in a catalog deemed of interest to the User. It also enables keeping track of different lists of works separately for the purpose of monitoring different metrics for different activities. The User can create these WatchLists and add or remove tracks to and from the lists at will. The contents (works) of the lists are static and won't change unless the User decides to do so. Examples of User-Defined WatchLists are: My Favorite Soul Songs, and Madonna's hit singles.

The User selects the WatchList to be viewed through drop-down box 402. The User may also select the time period (e.g., last week, last month, etc.) to be used for calculating any displayed metrics through drop-down box 403. An Alerts column 411 indicates whether an alert has been set against the corresponding title (or track). An Artist column 412, Album column 413, and Track column 414 respectively display artist, album, and track information for each music file in the selected WatchList.

A Penetration column 415, Supply Index column 416, Demand Index Column 417, and Effectiveness column 418 respectively display information of consolidated metrics for the penetration, supply, demand, and effectiveness of protection (if protected) for each music file in the selected WatchList. Although metrics are computed on a per network basis by the Instrumentation System 240, they are consolidated for all supported networks when reported in the WatchLists.

A Protection column 419 displays a protect button for each music file in the selected WatchList. If the music file is currently protected, the level of protection (e.g., Platinum, Gold, or Silver) is displayed in lettering on its corresponding protect button. On the other hand, if the music file is currently unprotected, the word "Protect" is displayed on its corresponding protect button. When the User clicks one of the protect buttons, a Pop-Up window appears (such as 601 of FIG. 6) and protection for the corresponding music file can be initiated or its level and/or duration modified.

Export Options 421 are provided so that information in the WatchList may be exported to other applications such as Excel, or as an XML or CSV file.

Figure 5:
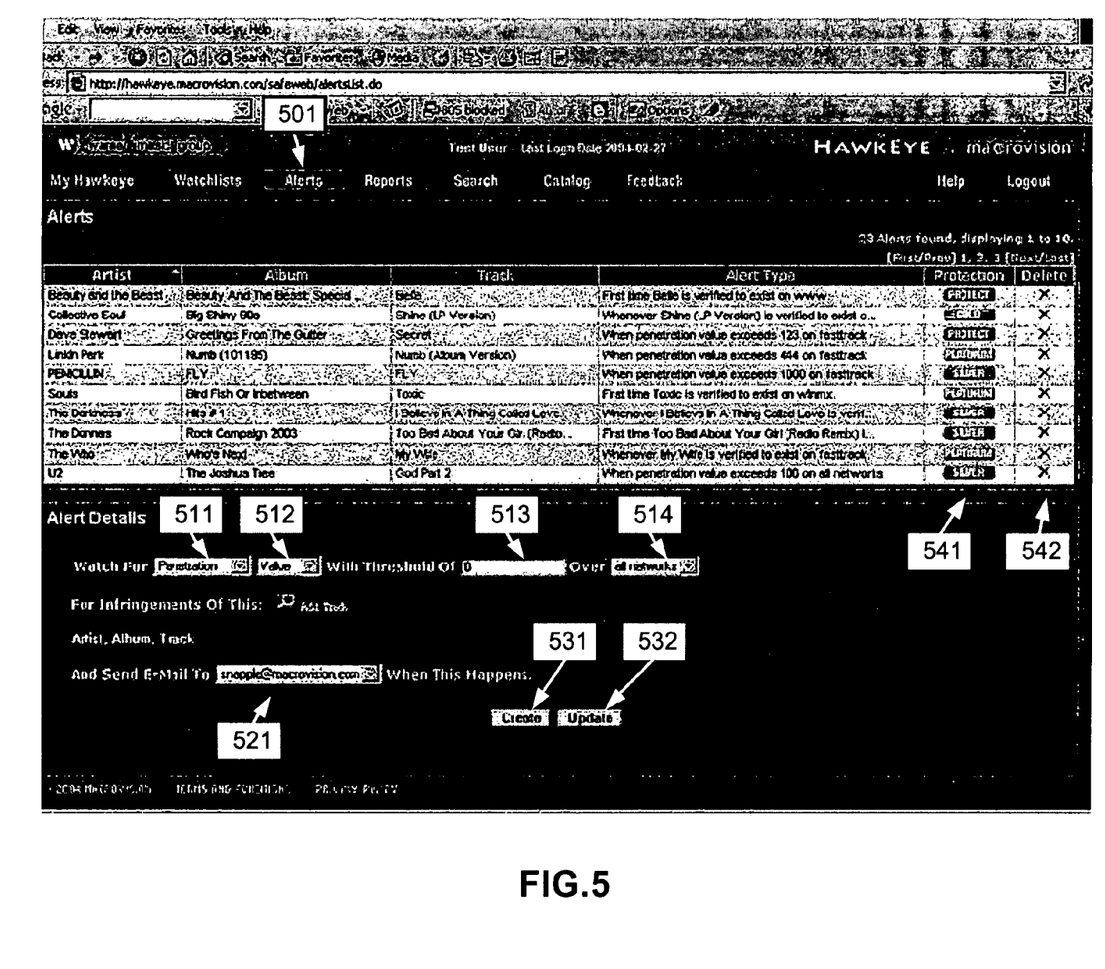
FIG. 5 illustrates an "Alerts" sub-page screen-shot generated through a user interface, utilizing aspects of the present invention.

FIG. 5 illustrates, as an example, an Alerts-page screen-shot generated by the Client User Interface. This page facilitates event-triggered email alerts that can be defined by the User. An event can be, for example, a first appearance of a protected title (i.e., a title associated with a protected file) on a monitored network or the value of a metric crossing a User-Defined threshold value. These alerts allow the User to closely monitor supply, demand and availability of titles and use the trend and event information for decision-making.

Drop-Down boxes 511, 512, 514 and type-in box 513 facilitate definition of the event by the User. Drop-Down box allows specification of an email address that alerts are to be sent to. Selectable email addresses in this case are specified by the Subscriber and stored in Subscriber profile information in the Database 202. Creation or updating of an event is triggered by the User clicking the Create button 531 or the Update button 532, as the case may be. Alerts can be deleted by clicking the appropriate check in the Delete column 542.

Figure 6:
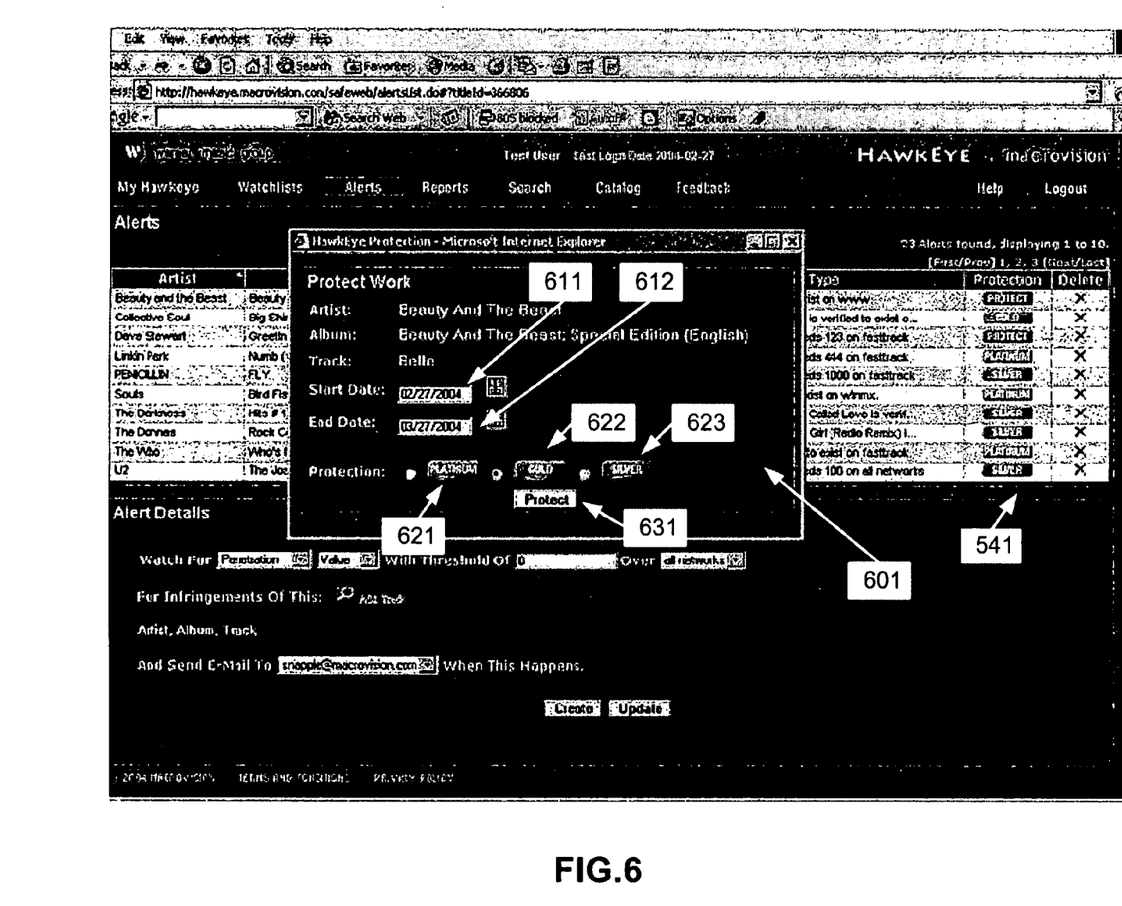
FIG. 6 illustrates a "Pop-Up" screen-shot generated through a user interface, utilizing aspects of the present invention.

FIG. 6 illustrates, as an example, a protection Pop-Up 601 generated by the client application software upon detecting a protect button (such as displayed in the Protection column 541) being clicked by the User. As previously explained, the User can protect a title by clicking its corresponding protect button in the WatchList or Alerts area. The User is provided different options in the Pop-Up 601 that represent different levels of protection such as Platinum 621 for highest level of protection (and highest cost to the Subscriber), Gold 622 for medium level protection, and Silver 623 for lowest level of protection (and lowest cost to the Subscriber). In addition, the User can specify the starting date for such protection in type-in box 611, and the ending date in type-in box 612. A second protect button 631 is provided so that the User can confirm that his or her selections have been made and trigger the protection mechanism upon clicking this button.

This protection enabling procedure allows the User to take interdiction measures with minimal effort. For example, the User may receive an alert informing him or her of the first appearance of a pre-release title. The User can then immediately issue a protection order for the title to prevent viral propagation of the title on the various file-sharing networks and soon receive metrics that will report the effectiveness of the interdiction campaign, and change in supply, demand, etc.

Figure 7:
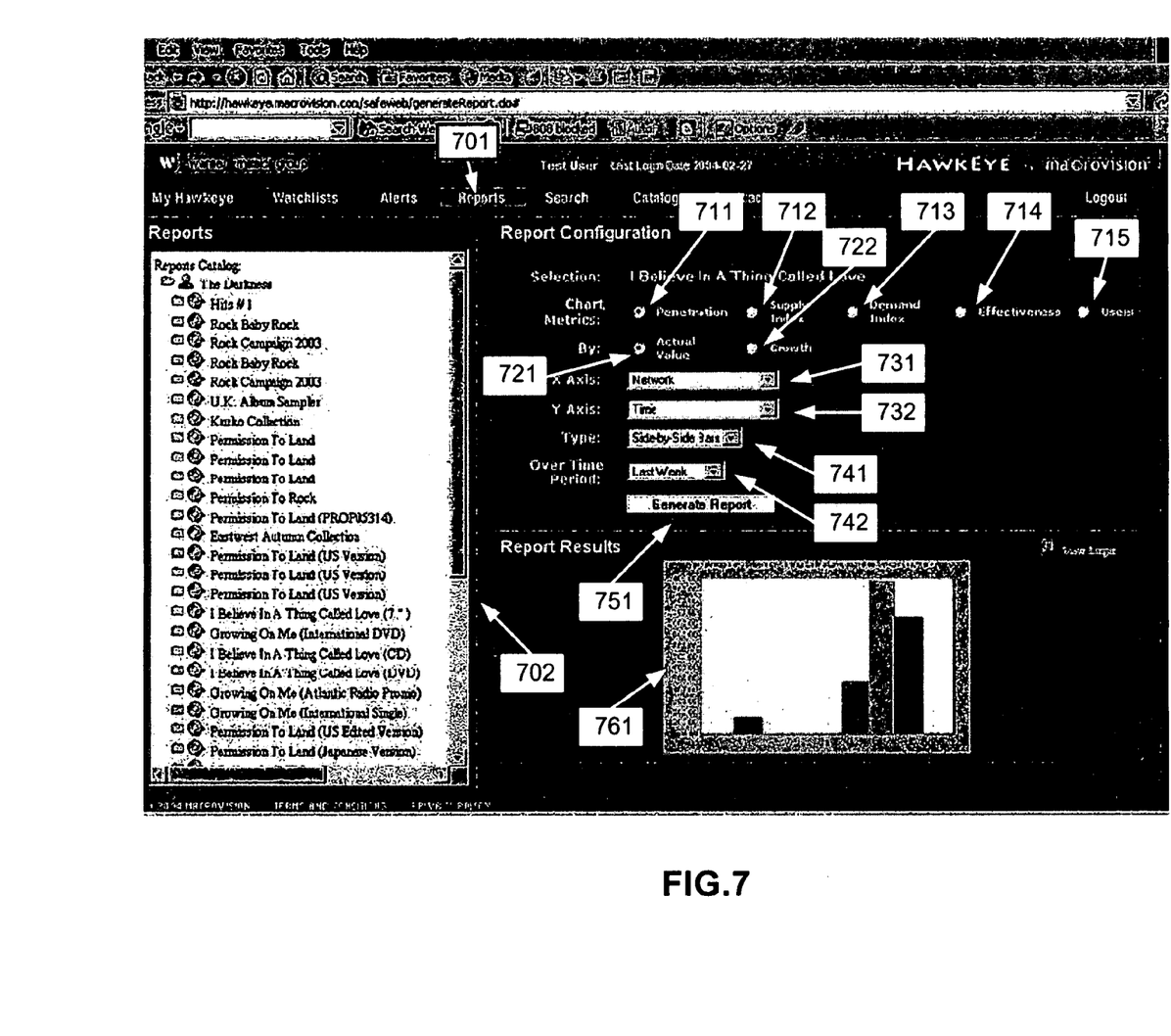
FIG. 7 illustrates a "Reports" sub-page screen-shot generated through a user interface, utilizing aspects of the present invention.

FIG. 7 illustrates, as an example, a reports-page screen-shot generated by the Client User Interface when the User selects the Reports tab 701 in the Navigation Menu. The User selects the artist, album or track in a reports catalog 702 for which reports are to be generated. For the selected title or album, the User selects the chart metric by clicking one of the buttons for Penetration 711, Supply Index 712, Demand Index 713, Effectiveness 714, or Users 715; by clicking one of the buttons for Actual Value 721 or Growth 722; by selecting in Drop-Down boxes 731 and 732 respectively the X-Axis and Y-Axis attributes; by selecting in Drop-Down box 741 the type of chart or graph; and by specifying the time period over which the metrics are to be calculated in Drop-Down box 742. Once all such selections have been made, then the User may click the Generate Report button 751, and the generated report is shown in the Report Results area 761. As previously described, the generated report may then be saved and exported by the User.

Figure 8:
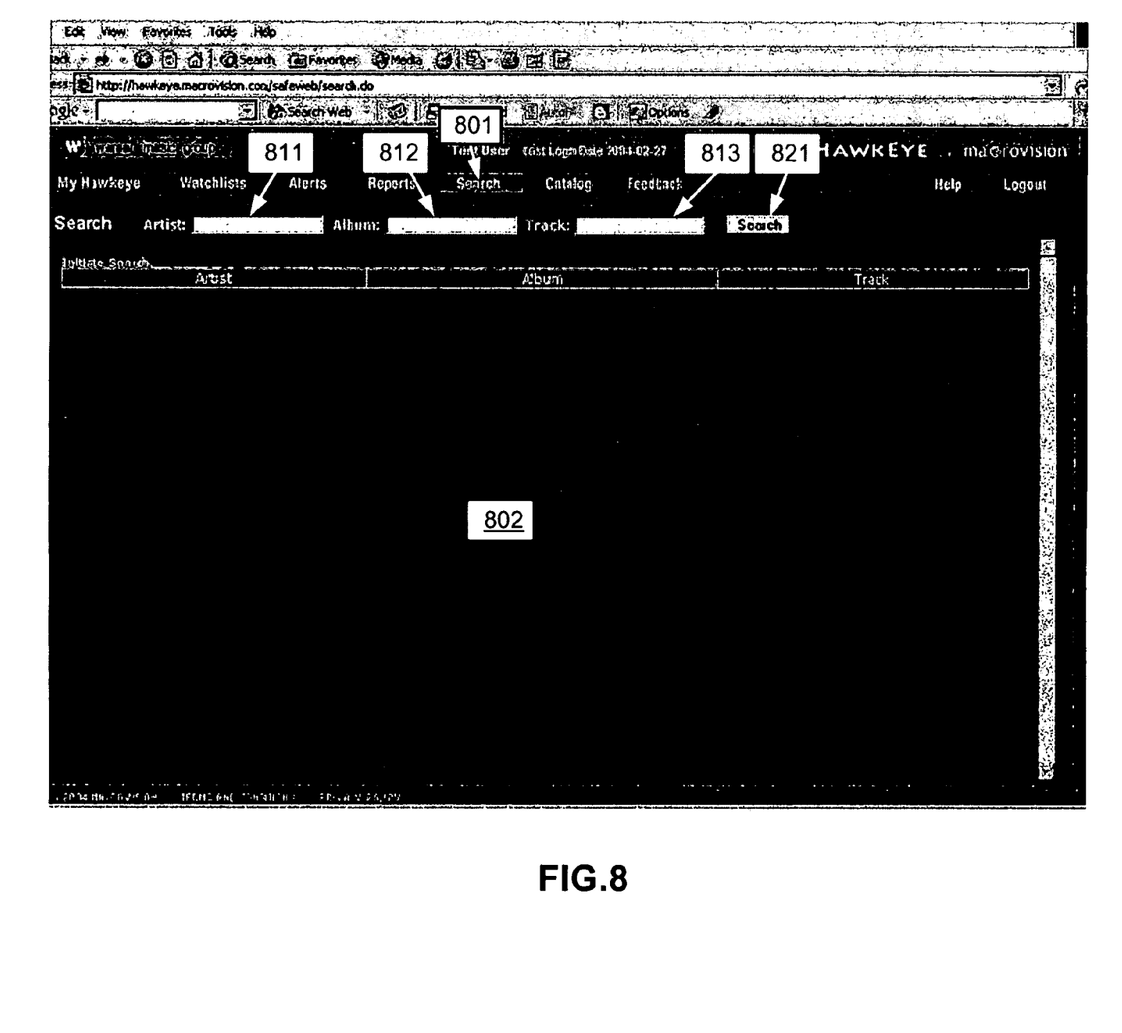
FIG. 8 illustrates a "Search" sub-page screen-shot generated through a user interface, utilizing aspects of the present invention.

FIG. 8 illustrates, as an example, a search-page screen-shot generated by the Client User Interface when the User selects the Search tab 801 on the Navigation Menu. The text search feature allows the User to find artists, albums and tracks that contain matching text input by the User in a type-in Artist box 811, and/or type-in Album box 812, and/or type-in Track title box 813. This allows the User to quickly access works for the purpose of monitoring, viewing charts or protecting against piracy. After initiating the search by the User clicking the Search button 821, the results are displayed in area 802 in an Artist, Album and Track format.

Figure 9:
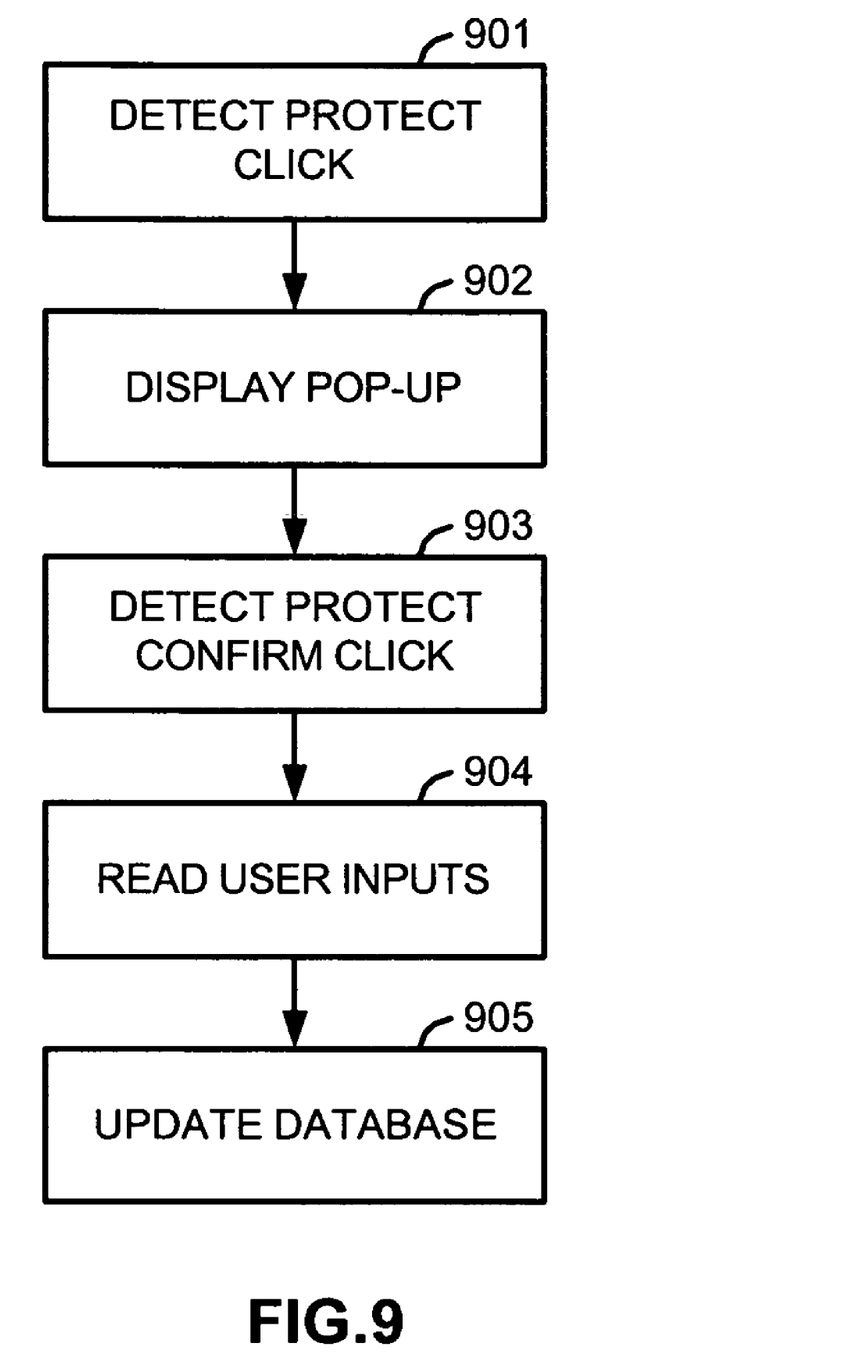
FIG. 9 illustrates a flow diagram of a "One-Click" method for providing a copy protection service, utilizing aspects of the present invention.

FIG. 9 illustrates, as an example, a flow diagram of a one-click protection method for protecting user specified content in a system providing a copy protection service. In 901, the clicking by a User of a protect button in a Protection column (such as 541 in FIG. 6) and a Music File (or track) row of a WatchList area is detected through the Client User Interface by, for example, client application software residing on the User's computer.

In 902, a Pop-Up (such as 601 in FIG. 6) is displayed on the User's display screen through the Client User Interface. The User then inputs the requested information into the Pop-Up, and clicks another protect button (such as 631 in FIG. 6) in the Pop-Up to indicate that the requested information has been provided.

In 903, the clicking by the User of the second protect button is detected through the Client User Interface by, for example, client application software residing on the User's computer.

In 904, the User inputs are read by, for example, client application software residing on the User's computer, and passed to the User Interface Manager 201. Examples of such User inputs are the start and end dates for the protection, and the level of protection.

In 905, the Database 202 is updated with the name of the music file and the User provided information of duration and level of copy protection for billing purposes as used by the Billing System 220, and the database 231 in the Interdiction System 230 is updated with the same name of the music file and the User provided information of duration and level of copy protection for copy protection purposes as used by the Interdiction System 230.

Although the various aspects of the present invention have been described with respect to a preferred embodiment, it will be understood that the invention is entitled to full protection within the full scope of the appended claims.

What is claimed is:

1. A system for a service provider to provide a copy protection service to a plurality of subscribers of the service, wherein each of the plurality of subscribers owns at least one file to be protected by the service from unauthorized copying and each of the plurality of subscribers controls a client computer, the system comprising:

a plurality of software agents controlled by the service provider, the plurality of software agents masquerading as nodes in a decentralized network for monitoring and interdicting file sharing activities of the files owned by the plurality of subscribers and being protected by the service; and a control center controlled by the service provider and configured to receive information of such monitoring from the plurality of software agents, process the information to generate processed monitoring information for each of the service protected files, provide the processed monitoring information for each of the service protected files to the client computer controlled by the subscriber owning the protected file, and command the plurality of software agents to perform such interdicting for each of the service protected files according to subscriber selected instructions received from the client computer controlled by the subscriber owning the protected file.

2. The system according to claim 1, wherein the control center includes an instrumentation system configured to generate the processed monitoring information by estimating characteristics of the decentralized network.

3. The system according to claim 2, wherein the estimated characteristics include a size of the decentralized network.

4. The system according to claim 3, wherein the estimated characteristics include a growth rate of the decentralized network.

5. The system according to claim 4, wherein the estimated characteristics include a growth acceleration of the decentralized network.

6. The system according to claim 2, wherein the estimated characteristics include a number of instances of the protected file in the decentralized network.

7. The system according to claim 6, wherein the estimated characteristics include a rate of propagation of the number of instances of the protected file in the decentralized network.

8. The system according to claim 7, wherein the estimated characteristics include an acceleration of propagation of the number of instances of the protected file in the decentralized network.

9. The system according to claim 2, wherein the estimated characteristics include a number of search requests for the protected file over a period of time in the decentralized network.

10. The system according to claim 2, wherein the estimated characteristics include a number of downloads of the protected file over a period of time in the decentralized network.

11. The system according to claim 1, wherein the control center includes an interdiction system configured to control the plurality of software agents so as to perform such interdicting.

12. The system according to claim 1, wherein each of the client computers controlled by the plurality of subscribers is configured with a user interface for communicating with the control center.

13. The system according to claim 12, wherein the processed monitoring information for each of the service protected files is presented to a user of the client computer controlled by the subscriber owning the file through the user interface.

14. The system according to claim 13, wherein the processed monitoring information for each of the service protected files is emailed to a user of the client computer controlled by the subscriber owning the file.

15. The system according to claim 14, wherein the processed monitoring information for each of the service protected files is emailed to the user of the client computer controlled by the subscriber owning the file according to criteria established by the user.

16. The system according to claim 12, wherein the interdiction instructions for each of the service protected files are transmitted from the client computer controlled by the subscriber owning the file to the control center through the user interface of the client computer.

17. The system according to claim 16, wherein a protection icon is displayed adjacent the processed monitoring information for each of the service protected files by the user interface on a display screen of the client computer controlled by the subscriber owning the file, and generation of the interdiction instructions for each of the service protected files is initiated by the user of the client computer controlled by the subscriber owning the file selecting the protection icon.

18. The system according to claim 17, wherein the user of the client computer controlled by the subscriber owning the file selects the protection icon by clicking on it with a pointing device.

19. The system according to claim 18, wherein a pop-up menu is displayed on the display screen in response to the user of the client computer controlled by the subscriber owning the file clicking on the protection icon, and the user of the client computer controlled by the subscriber owning the file specifies duration of interdiction through the pop-up menu.

20. The system according to claim 18, wherein a pop-up menu is displayed on the display screen in response to the user of the client computer controlled by the subscriber owning the file clicking on the protection icon, and the user of the client computer controlled by the subscriber owning the file specifies a level of interdiction through the pop-up menu.

21. The system according to claim 20, further comprising a billing system so that the user of the client computer controlled by the subscriber owning the file is appropriately charged for the level of interdiction selected by the user of the client computer controlled by the subscriber owning the file through the pop-up menu.

22. The system according to claim 1, wherein the plurality of software agents masquerade as nodes in a plurality of decentralized networks for monitoring and interdicting file sharing activities of the protected files owned by the plurality of subscribers.

23. A method for a service provider to provide a copy protection service to a plurality of subscribers of the service, wherein each of the plurality of subscribers owns at least one file to be protected by the service from unauthorized copying and each of the plurality of subscribers controls a client computer, the method comprising:
  receiving file sharing information for the files to be protected by the service in one or more decentralized networks from a plurality of software agents controlled by the service provider, the plurality of software agents masquerading as nodes in the one or more decentralized networks;
  providing the file information for each file to be protected to the client computer controlled by the subscriber that owns the file;
  receiving subscriber selected interdiction instructions for each of the files to be protected from the client computer controlled by the subscriber that owns the file; and
  commanding the plurality of software agents to interdict file sharing activities in the one or more decentralized networks for each of the files to be protected according to the interdiction instructions received from the client computer controlled by the subscriber that owns the file.

24. The method according to claim 23, further comprising: monitoring file sharing activity in the one or more decentralized networks for the files to be protected to generate the file information for each of the protected files.

25. The method according to claim 24, wherein the monitoring of file sharing activity comprises: estimating a number of instances of individual of the protected files in individual of the one or more decentralized networks.

26. The method according to claim 24, wherein the monitoring of file sharing activity comprises: estimating a number of search requests over a period of time for individual of the protected files.

27. The method according to claim 24, wherein the monitoring of file sharing activity comprises: estimating a number of downloads over a period of time for individual of the protected files.

28. The method according to claim 23, wherein the providing of the file information comprises: presenting file information for individual of the protected files to a user through a user interface of the client computer controlled by the subscriber that owns the protected file.

29. The method according to claim 23, wherein the providing of the file information for each of the protected files comprises: emailing file information for the protected file to a user of the client computer controlled by the subscriber that owns the protected file.

30. The method according to claim 23, further comprising: providing a selectable protection option along with the file information for each of the protected files to the client computer controlled by the subscriber that owns the protected file so that a user of the client computer may initiate generation of the interdiction instructions for the protected file by selecting the selectable protection option.

31. The method according to claim 23, further comprising: charging each subscriber according to the subscriber selected interdiction instructions received from the client computer controlled by the subscriber.

32. A one-click method implemented in at least one server controlled by a service provider for providing a copy protection service to a plurality of subscribers of the service, wherein each of the plurality of subscribers owns at least one file to be protected by the service from unauthorized copying and each of the plurality of subscribers controls a client computer, the method comprising:
receiving protection commands and subscriber selected protection criteria for files to be protected from the client computers controlled by the subscribers that own the files;
updating billing information for the plurality of subscribers to reflect the received protection commands and subscriber selected protection criteria; and
interdicting file sharing activities for the files to be protected in a decentralized network according to the received protection commands and subscriber selected protection criteria.

33. The method according to claim 32, further comprising: providing information for each of the files to be protected in the decentralized network to the client computer controlled by the subscriber that owns the protected file prior to receiving the protection command.

34. The method according to claim 33, wherein the information for each of the protected files includes an estimate of a number of instances of the protected file in the decentralized network.

35. The method according to claim 33, wherein the information for each of the protected files includes an estimate of a number of search requests over a period of time for the protected file in the decentralized network.

36. The method according to claim 33, wherein the information for each of the protected files includes an estimate of a number of downloads over a period of time for the protected file in the decentralized network.

37. The method according to claim 33, wherein the information for each of the protected files is provided to a user of the client computer controlled by the subscriber that owns the protected file through a user interface residing on the client computer.

38. The method according to claim 33, wherein the information for each of the protected files is provided to a user of the client computer controlled by the subscriber that owns the protected file by email according to pre-established criteria.

39. The method according to claim 38, wherein the pre-established criteria is specified by the user through the user interface.

40. The method according to claim 33, further comprising: providing a protection option along with the information for each of the protected files to the client computer controlled by the subscriber that owns the protected file so that a user of the client computer may initiate the protection command by selecting the protection option.

41. The method according to claim 32, wherein the billing information for the plurality of subscribers includes an identification of the protected file owned by the subscriber and a level of the interdiction of file sharing activities for the protected file.

42. A system for providing a copy protection service, comprising:
a control center configured to perform instrumentation and interdiction functions for subscriber specified files in at least one file sharing network; and
a subscriber operated client computer configured to receive results of the instrumentation function from the control center, display the results in a user selected format, facilitate user selection of an interdiction function from a plurality of user selectable interdiction functions distinguished by level of interdiction and duration of interdiction, and provide information of the user selected interdiction function to the control center.

43. The system according to claim 42, wherein the subscriber specified files include subscriber specified objects.

44. The system according to claim 42, wherein the instrumentation functions include estimation of a number of instances, a rate of propagation, and an acceleration of propagation of the subscriber specified files in the at least one file sharing network.

45. The system according to claim 42, wherein the instrumentation functions include estimation of search and download activities for and of the subscriber specified files in the at least one file sharing network.

46. The system according to claim 42, wherein the subscriber operated client computer is configured with a client user interface running as an application launched in a web browser to facilitate subscriber selection of the instrumentation and interdiction functions to be performed by the control center.

47. The system according to claim 46, wherein the client user interface facilitates subscriber selection of an instrumentation function to estimate a number of copies of a subscriber specified file in the at least one file sharing network.

48. The system according to claim 46, wherein the client user interface facilitates subscriber selection of the subscriber specified file.

49. The system according to claim 46, wherein the client user interface facilitates subscriber selection of an instrumentation function to estimate a change in a number of copies of a subscriber specified file in the at least one file sharing network over a subscriber specified period of time.

50. The system according to claim 49, wherein the client user interface facilitates subscriber selection of the subscriber specified file.

51. The system according to claim 49, wherein the client user interface facilitates subscriber selection of the period of time over which the change in the number of copies of the subscriber specified file is to be estimated in the at least one file sharing network.

52. The system according to claim 46, wherein the client user interface facilitates subscriber selection of a file sharing network for estimating the number of copies of the subscriber specified file in.

53. The system according to claim 42, wherein the subscriber operated client computer is further configured to provide subscriber specified reports resulting from performance of the instrumentation and interdiction functions by the control center.

54. The system according to claim 53, wherein the subscriber operated client computer is configured with a client user interface running as an application launched in a web browser to facilitate subscriber selection of the instrumentation and interdiction functions to be performed by the control center.

55. The system according to claim 54, wherein the subscriber specified reports are displayed as graphs in the client user interface according to subscriber specified graph attributes.

56. The system according to claim 55, wherein the subscriber specified graph attributes include penetration of copies of a subscriber specified file in the at least one file sharing network.

57. The system according to claim 55, wherein the subscriber specified graph attributes include a supply index for copies of a subscriber specified file in the at least one file sharing network.

58. The system according to claim 55, wherein the subscriber specified graph attributes include a demand index for copies of a subscriber specified file in the at least one file sharing network.

59. The system according to claim 55, wherein the subscriber specified graph attributes include an effectiveness of interdiction for copies of a subscriber specified file in the at least one file sharing network.

60. The system according to claim 55, wherein the subscriber specified graph indicates an attribute value over subscriber specified time increments.

61. The system according to claim 55, wherein the subscriber specified graph indicates attribute values for subscriber specified file sharing networks.

* * * * *